United States Patent [19]

McNish et al.

[11] Patent Number: 4,944,247

[45] Date of Patent: Jul. 31, 1990

[54] ANIMAL LITTER

[75] Inventors: Billy G. McNish, Little Rock; Jarvis Harper, Benton, both of Ark.

[73] Assignee: Aluminum Company of America, Pittsburgh, Pa.

[21] Appl. No.: 837,186

[22] Filed: Mar. 7, 1986

[51] Int. Cl.$^5$ .............................................. A01K 1/015
[52] U.S. Cl. ...................................................... 119/1
[58] Field of Search ............................................ 119/1

[56] References Cited

U.S. PATENT DOCUMENTS

| | | | |
|---|---|---|---|
| 3,630,353 | 12/1971 | Seidel et al. | 75/5 X |
| 3,701,734 | 10/1972 | Stover | 106/117 X |
| 3,879,214 | 4/1975 | Lowe et al. | 106/117 X |
| 4,085,704 | 4/1978 | Frazier | 119/1 |
| 4,275,684 | 6/1981 | Kramer et al. | 119/1 |
| 4,314,980 | 2/1982 | Shen et al. | 423/331 |
| 4,436,550 | 3/1984 | Kapolyi | 106/117 X |
| 4,509,457 | 4/1985 | Durbye | 119/1 |

OTHER PUBLICATIONS

T. G. Pearson, *The Chemical Background of the Aluminum Industry*, 1955 No. 3, pp. 84–85.

L. Thompson & V. H. Ledbetter, *Dicalcium Silicate (Brown Mud) as an Agricultural Liming Material*, vol. 18, 1964, pp. 55, 56 & 58.

L. Thompson, *Brown Mud—A Substitute for Limestone*, Sep.–Oct., 1966, p. 7.

*Primary Examiner*—Robert P. Swiatek
*Attorney, Agent, or Firm*—Daniel A. Sullivan, Jr.

[57] ABSTRACT

Animal litter comprising, as a sorbent, suitably sized sinter by-product of Bayer process residue.

3 Claims, No Drawings

ANIMAL LITTER

TECHNICAL FIELD

This invention relates particularly to animal litter and, in general, to a sorbent material suitable for various uses.

BACKGROUND ART

U.S. Pat. Nos. 4,275,684 and 4,509,457 relate to the manufacture of animal litter essentially of formula $CaO.SiO_2$.

DISCLOSURE OF INVENTION

The present invention is based on the discovery that a sorbent material of quite desirable characteristics can be made from a sinter by-product that results from the processing of bauxite into aluminum hydroxide. This sinter by-product, also called "brown mud", is formed during a sinter-leach process that captures aluminium oxide from Bayer process residue. We use the term "sinter by-product" in preference to "brown mud", because the term "mud" generally denotes characteristics associated with clay, sinter-by-product is dicalcium silicate and does not exhibit these characteristics. Details on the Bayer process and the processing which results in the sinter by-product are given in "The Chemical Background of the Aluminum Industry", Lectures, Monographs and Reports, 1955, No. 3 by T. G. Pearson, The Royal Institute of Chemistry, London. See particularly pages 84 and 85 in Pearson concerning production of brown mud.

The sinter by-product is principally dicalcium silicate, but also contains both calcium and sodium aluminum silicates, which are members of the zeolite family. Minor constituents include iron and titanium minerals, as well as trace amounts of sodium salts.

The sintered by-product is a glass-like, porous material, with both internal and external surface area. The porosity provides for more points of contact for retaining water, removing odors, etc. Both water and odors may be absorbed and/or adsorbed by the material.

Stored sinter by-product will usually have a particle size too large for sorbent, and particularly animal litter, uses. Consequently, it is crushed and screened to maximize product in a size range suitable for the intended use.

Cat litter typically ranges from 5 to 1 mm. Tyler sieves of 4 and 16 mesh, respectively, are suitable for making these cuts.

Poultry litter typically ranges from ¾" to 5 mm. Tyler sieves of ¾" and 4 mesh, respectively, are suitable for making these cuts.

As a sorbent, the particle sizes may range from 10 mm to 10 microns. Particle size will be dictated by whether the material is used in the liquid or gas phase, or for chromatography. This covers the Tyler sieve range from ¾" to 150 mesh.

Stored sinter by-product will usually be wet. Optimum sieving can be carried out at a moisture content as high as 30 percent.

The sized product is dried, to make it sorbent, and packaged for its end use. Depending on the particular end use, other processing steps can be interposed, such as granulating, selective mining (to influence final composition), moisture addition, bagging, compacting, additives, etc.

The uses of the product of the invention include, but are not limited to, animal litter in general, and cat, dog, horse and poultry litter in particular, oil absorbent, gas phase applications, chromatography applications, ice melt, and road base construction.

Percentages herein are on a weight basis, unless stated otherwise.

BEST MODE FOR CARRYING OUT THE INVENTION

A sinter by-product sample from a holding lake at the Arkansas Operations of Aluminum Company of America, Bauxite, Ark., was collected. This material will typically have a composition as follows:

| Component Name | Component Formula | Component % |
| --- | --- | --- |
| Dicalcium silicate | $2CaO.SiO_2$ | 57 |
| Hematite | $F_2O_3$ | 6 |
| Calcite | $CaCO_3$ | <8 |
| Gehlenite | $2CaO.Al_2O_3.SiO_2$ | <22 |
| Perovskite | $CaO.TiO_2$ | <5 |
| Anatase | $TiO_2$ | <3 |
| Sodalite | $3Na_2O.3Al_2O_3.6SiO_2.Na_2SO$ | <25 |
| Calcium aluminum sulfate | $4CaO.3Al_2O_3.SO_3$ | <5 |
| Sodium salts | $Na_2CO_3$ and $NaAlO_2$ | trace |

Such sinter by-product was screened, heated at 100° C. until bone dry, and submitted to a private laboratory for testing. It was determined that the material had no objectionable characteristics in terms of skin or eye irritation. Samples of the product were also distributed to cat owners. Cat owner responses showed the product to be suitable as animal litter.

The product was additionally tested in comparison to major cat box fillers on the market. Results are presented in the following table:

| Product | Absorbency % By Weight | Bulk Density g/L |
| --- | --- | --- |
| Major Brand A | 84 | 667 |
| Major Brand B | 92 | 502 |
| Major Brand C | 126 | 732 |
| Major Brand D | 108 | 658 |
| Major Brand E | 51 | 688 |
| Generic | 56 | 667 |
| Sinter By-Product | 80 | 675 |

Absorbency was determined as per ASTM method designation C 127-59 with the following modifications: namely, the time that the products remained in the water was reduced from 24 hours to one minute for all products tested, the particle size used was minus 4 mesh plus 14 mesh, and the material was allowed to drain rather than rolling in an absorbent cloth to remove surface water. The sinter by-product retained its integrity upon wetting, whereas many of the other products tested did not.

While the invention has been described in terms of preferred embodiments, the claims appended hereto are intended to encompass all embodiments which fall within the spirit of the invention.

What is claimed is:

1. The method of using sinter by-product, formed during a sinter-leach process that captures aluminum oxide from Bayer process residue, comprising placing it in a sized and dried form as litter for animals.

2. The method of claim 1, wherein the sinter by-product has a particle size lying about in the range of 5 to 1 mm.

3. The process of claim 1, wherein the sinter by-product has a particle size lying about in the range of ¾-inch to 5 mm.

* * * * *